April 4, 1961   G. F. DEARY, SR., ET AL   2,977,901
HARD ROLL SCORER AND FORMER
Filed Dec. 8, 1958
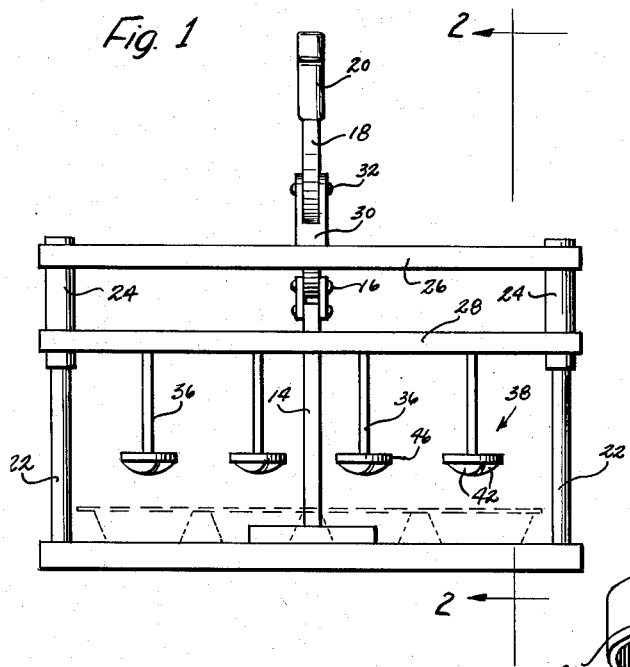
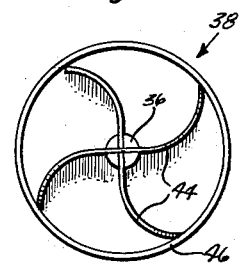
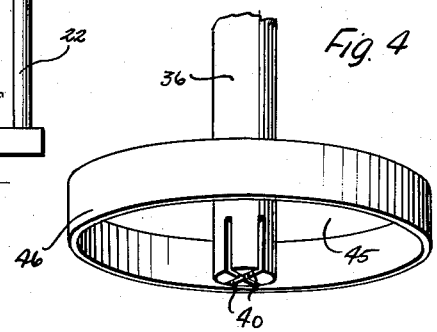
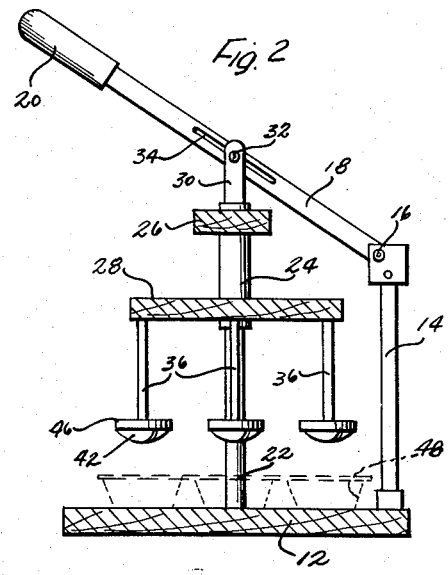
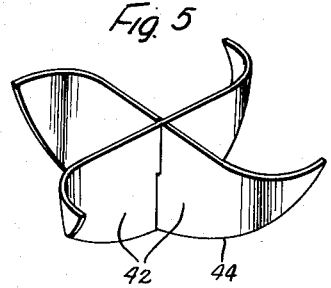
INVENTORS
George F. Deary, Sr.
Alfred A. Provost

2,977,901
HARD ROLL SCORER AND FORMER

George F. Deary, Sr., 38 Franklin Ave., Oakville, and Alfred A. Provost, Oakville, Conn. (27 East St., New Milford, Conn.)

Filed Dec. 8, 1958, Ser. No. 778,696

1 Claim. (Cl. 107—8)

This invention relates to baking apparatus and more particularly to a device for preparing rolls.

It is an object of the present invention to provide a device for mass scoring and forming of dough used for the baking of hard rolls so as to effectively eliminate the hand forming and scoring thereof.

A further object of the present invention is to provide a hard roll scorer and former of the above type which is completely manually operated and will produce substantially identical rolls in size and shape at all times.

Other objects of the invention are to provide a hard roll scorer and former bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a front view of a hard roll scorer and former made in accordance with the present invention;

Figure 2 is a transverse cross sectional view taken along line 2—2 of Figure 1;

Figure 3 is a bottom plan view of one of the cutters forming a part of the present invention;

Figure 4 is an enlarged perspective view of certain parts of the cutter shown in Figure 3; and Figure 5 is a perspective view of another part of the cutter shown in Figure 3.

Referring now more in detail to the drawing, a hard roll scorer and former device 10 made in accordance with the present invention is shown to include a substantially flat base 12 in the form of a platform having a stanchion 14 secured to the center thereof. This stanchion includes a pivot pin 16 at its upper end that pivotally supports one end of an actuating lever 18 having a handle 20 at the opposite end.

The base 12 also supports a pair of upstanding posts 22 that are slidably received within sleeve guide members 24 integral with framing members 26, 28 of a movable frame assembly that may be actuated by the lever 18 in a manner hereinafter more fully described. A bearing member 30 secured to the upper framing member 26 is bifurcated and has a transversely extending pivot pin 32 that is slidably received within a longitudinal slot 34 extending through the mid section of the lever 18. Thus, in response to a downward movement of the handle portion 20, the frame members 26, 28, 30 are moved downwardly relative to the base 12. During this downward movement, a plurality of cutters 38 carried by depending rods 36 secured to the frame member 28 are movable into scoring and forming engagement with individual portions of roll dough carried within the individual cups of a cupcake baking tray 48.

With more specific references to Figures 3 to 5 of the drawing, each such cutter 38 includes a pair of intersecting, S-shaped, propeller-like blades 42, each having a downwardly facing arcuate edge 44. These intersecting blades 42 are slidably received upwardly within a pair of intersecting slots 40 in the lower end of the depending rod 36, thus making it easy to clean and maintain these parts. A circular plate 45 is secured to each rod 36 above the cutters 42 and includes a depending peripheral skirt 46 which partially encloses the upper portions of the blades 42.

The operation of this device will now be more readily understood. Any desired type of tray 48 having individual pockets within which a single portion of dough may be placed, is placed upon the base 12 beneath the cutters 38. By then moving the handle 20 downwardly, the blades 42 of the cutters are moved into scoring and forming engagement with the individual dough portions, so as to form them properly prior to baking. Thus, a substantially large number of pieces of dough can be formed simultaneously to increase the rate of production and to make for more uniform baking and use of baking products.

While various changes may be made in the detail construction, it shall be understood that such changes shall be within the spirit and scope of the present invention as defined by the appended claim.

What we claim as new and desire to protect by Letters Patent of the United States is:

A hard roll scorer and former, comprising in combination, a base, a frame slidably received on vertical guides projecting from each end of said base, a lever pivotally secured at one end to a stanchion projecting from said base, the mid section of said lever having a slot for pivotal and sliding engagement with said frame, and a plurality of cutters connected to the ends of rods projecting vertically downwards from the underside of said frame, said cutters consisting of two S-shaped blades intersecting at right angles to each other removably received in slots formed on the ends of said rods, said blades having cutting edges formed in a downwardly convex manner symmetrically with respect to said rods, said blades being retained in said slots by a peripheral skirt embracing the outer portions of said blades, the convex portion of said blades projecting downwardly beneath said skirt.

References Cited in the file of this patent

UNITED STATES PATENTS

| | | |
|---|---|---|
| D. 114,471 | Rosenbeg | Apr. 25, 1939 |
| 1,076,509 | Mitschler | Oct. 21, 1913 |
| 1,551,088 | Collis | Aug. 25, 1925 |
| 1,613,223 | Davis | Jan. 4, 1927 |
| 1,798,007 | Von Berg | Mar. 24, 1931 |
| 2,212,991 | Sobel | Aug. 27, 1940 |